United States Patent
Wagener et al.

(10) Patent No.: US 11,059,940 B2
(45) Date of Patent: Jul. 13, 2021

(54) HIGH TEMPERATURE METATHESIS CHEMISTRY

(71) Applicant: UNIVERSITY OF FLORIDA RESEARCH FOUNDATION, INCORPORATED, Gainesville, FL (US)

(72) Inventors: Kenneth B. Wagener, Gainesville, FL (US); Michael H. Bell, North East, MD (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 0 days.

(21) Appl. No.: 15/930,632

(22) Filed: May 13, 2020

(65) Prior Publication Data
US 2020/0399423 A1 Dec. 24, 2020

Related U.S. Application Data

(62) Division of application No. 15/998,762, filed on Aug. 16, 2018, now Pat. No. 10,683,388.

(60) Provisional application No. 62/545,504, filed on Aug. 15, 2017.

(51) Int. Cl.
| | |
|---|---|
| *C08G 61/08* | (2006.01) |
| *C08G 61/12* | (2006.01) |
| *C08G 75/20* | (2016.01) |
| *C08K 5/08* | (2006.01) |
| *B01J 31/22* | (2006.01) |

(52) U.S. Cl.
CPC .......... *C08G 61/08* (2013.01); *B01J 31/2278* (2013.01); *C08G 61/12* (2013.01); *C08G 75/20* (2013.01); *C08K 5/08* (2013.01); *B01J 2231/14* (2013.01); *B01J 2231/543* (2013.01); *B01J 2531/821* (2013.01); *C08G 2261/122* (2013.01); *C08G 2261/344* (2013.01); *C08G 2261/418* (2013.01); *C08G 2261/419* (2013.01); *C08G 2261/724* (2013.01)

(58) Field of Classification Search
CPC ........ C08G 61/08; C08G 61/12; C08G 75/20; C08K 5/08; B01J 31/2278
See application file for complete search history.

(56) References Cited

U.S. PATENT DOCUMENTS

| | | | |
|---|---|---|---|
| 2007/0282148 A1* | 12/2007 | Berlin | ................ B01J 31/2404 585/645 |
| 2013/0137829 A1 | 5/2013 | Holtcamp et al. | |
| 2019/0144611 A1 | 5/2019 | Wagener et al. | |

OTHER PUBLICATIONS

Gaines T, et al, "High melting precision sulfone polyethylenes synthesized by ADMET chemistry", Macromolecular Chemistry and Physics, vol. 217, Issue 21, pp. 2351-2359 (2016).

(Continued)

*Primary Examiner* — Catherine S Branch
(74) *Attorney, Agent, or Firm* — Timothy H. Van Dyke; Wolter Van Dyke Davis, PLLC

(57) ABSTRACT

A method of carrying out a metathesis reaction includes the combination of at least one alkene or non conjugated diene with a Ruthenium-based catalyst with an cyclic(alkyl)(amino)carbene ligand to form a reaction mixture and heating the reaction mixture to a temperature of 100° C. or greater. The reaction can be an ADMET, ROMP, a metathesis ring-closure or an olefin exchange reaction.

11 Claims, 4 Drawing Sheets

(56) References Cited

OTHER PUBLICATIONS

Weychardt H, et al., "Acyclic Diene metathesis polymerization of divinylarenes and divinylferrocenes with grubbs-type olefin metathesis catalysts", Organometallics, vol. 27, Issue 7, pp. 1479-1485 (2008).

\* cited by examiner

HIGH TEMPERATURE METATHESIS CHEMISTRY

CROSS-REFERENCE TO RELATED APPLICATION

This application is a divisional of U.S. application Ser. No. 15/998,762 filed on Aug. 16, 2018 and claims the benefit of U.S. Provisional Patent Application No. 62/545,504, filed Aug. 15, 2017, titled HIGH TEMPERATURE METATHESIS CHEMISTRY, which are incorporated by reference herein in their entirety.

STATEMENT REGARDING FEDERALLY SPONSORED RESEARCH OR DEVELOPMENT

This invention was made with government support under W911NF-13-1-0362 awarded by the ARMY/ARO. The government has certain rights in this invention.

BACKGROUND

Early methods for olefin metathesis or olefin disproportionation were performed using ill-defined metathesis catalyst based on group VI and VII transition metals (W, Mo, and Re). The advent of well-defined Grubb's ruthenium type catalysts introduced stability under ambient conditions and functional group tolerance to metathesis chemistry. Olefin metathesis using Grubb's type ruthenium catalysts are traditionally performed at temperatures ranging from 20 to 60° C. Degradation or olefin migration can be problematic at elevated temperatures. Access to elevated reaction temperatures can potentially enhance metathesis chemistry by unlocking products previously unrealized due to thermodynamic constraints. Metathesis polymerization above the polymer's melting temperature can benefit by allowing the resultant polymer chains to remain unconstrained by crystallization to increase chain diffusion and molecular weight during polymerization.

In the case of metathesis polymerization, acyclic diene metathesis polymerization (ADMET) has been shown to be a useful technique for synthesizing precision functional polyolefin derivatives. The resultant polymers are highly crystalline, exhibiting high melting temperatures. As a result, the polymers are synthesized in solution or solid state. Both techniques limit efficient step growth polymerization, restricting the molecular weight attainable. Additionally, solution polymerization requires the application of vacuum during polymerization. Negative pressure is necessary to remove gaseous ethylene and drive the metathesis equilibrium towards polymerization. Weychardt et al. *Organometallics*, 2008, 27 (7), pp 1479-85 developed a procedure using high boiling point solvents thus light vacuum could be applied. While this method is valuable, solvent purification is required and the use of solvent is cumbersome for scale up and industrial process.

Gaines et al. *Macromol. Chem. Phys.* 2016, 217, 2351-9 demonstrated precision aliphatic polysulfones synthesized via ADMET. The polymers displayed high melting temperature which increased with increasing sulfone content. Both bulk and solution polymerization techniques were ineffective at producing high molecular weight polymer. The high melting temperature of the polymer limited polymer molecular weight using bulk synthesis with Grubb's $1^{st}$ generation catalyst. Raising the polymerization temperature to above the melting temperature ($T_m$) of unsaturated polymer product (about 130° C.) degrades the catalyst. Solution polymerization was performed; however, polymer insolubility limited the polymer's molecular weight. The polysulfones are a prime candidate for bulk high-temperature metathesis polymerization.

Hence there remains a need for carrying out metathesis reactions at temperatures in excess of 100° C.

BRIEF SUMMARY

Various embodiments are directed to carrying out the metathesis of an olefin, which is an organic molecule with at least one alkene or at least two non-conjugated ene-groups, using a Ruthenium-based catalyst, such as a Hoveyda-Grubb's type catalyst, comprising an asymmetric N-heterocyclic carbene ligand or a cyclic (alkyl)(amino)carbene ligand (hereinafter, a "Ruthenium-based catalyst") with heating the reaction mixture to a temperature greater than 100° C. The metathesis can be part of a metathesis polymerization where, in the case of a ring-opening metathesis polymerisation (ROMP), a cyclic monomer or a combination of cyclic monomers are converted to a polymer with ring-opening or, where in the case of an ADMET polymerization, one or more linear $\alpha,\omega$-dieneyl-monomer are condensed with the loss of a small alkene, with the polymer formed after combining the monomer with a Ruthenium-based catalyst and heating to a temperature greater than 100° C. The metathesis can be a ring-closure reaction where an acyclic non-conjugated diene self condenses in the presence of a Ruthenium-based catalyst when heated to a temperature above 100° C.

These and other features, aspects, and advantages of various embodiments will become better understood with reference to the following description, figures, and claims.

BRIEF DESCRIPTION OF THE FIGURES

Many aspects of this disclosure can be better understood with reference to the following figures, in which.

Figure 1:
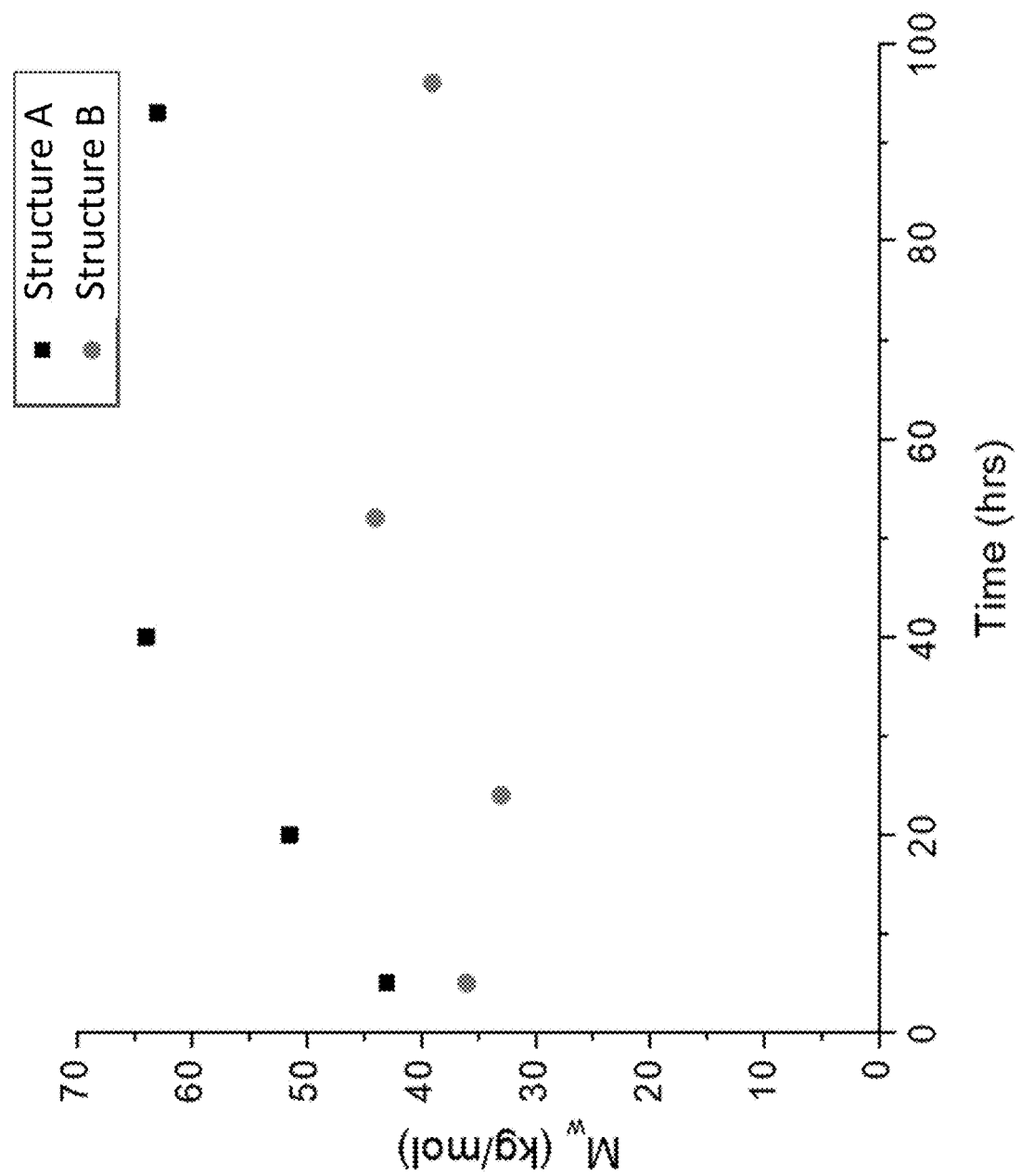
FIG. 1: is an example according to various embodiments, illustrating a plot of weight average molecular weight dependence of unsaturated poly(octylene) on reaction time at 100° C. using a catalyst according to Structure A and a catalyst according to Structure B.

It should be understood that the various embodiments are not limited to the examples illustrated in the figures.

DETAILED DESCRIPTION

Various embodiments may be understood more readily by reference to the following detailed description. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As used herein, the term "standard temperature and pressure" generally refers to 20° C. and 1 atmosphere. Standard temperature and pressure may also be referred to as "ambient conditions." Unless indicated otherwise, parts are by weight, temperature is in ° C., and pressure is at or near atmospheric. The terms "elevated temperatures" or "high-temperatures" generally refer to temperatures of at least 100° C.

The term "mol percent" or "mole percent" generally refers to the percentage that the moles of a particular component are of the total moles that are in a mixture. The sum of the mole fractions for each component in a solution is equal to 1.

As used herein, the term "metathesis" generally refers to a reaction in which two compounds exchange ions, typically with precipitation of an insoluble product.

It is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by prior disclosure. Further, the dates of publication provided could be different from the actual publication dates that may need to be independently confirmed.

Unless otherwise indicated, the present disclosure is not limited to particular materials, reagents, reaction materials, manufacturing processes, or the like, as such can vary. It is also to be understood that the terminology used herein is for purposes of describing particular embodiments only and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Various embodiments are directed to methods of performing metathesis chemistry at temperatures of at least 100° C. that may employ catalysts. For example, two schematic chemical structures of suitable ruthenium catalysts, are illustrated shown in Structure A and in Structure B.

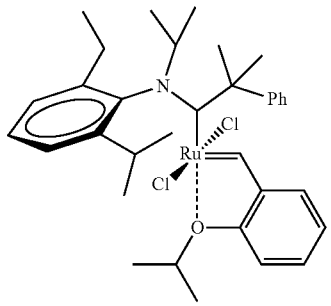

Structure A

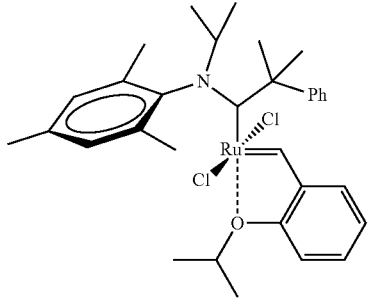

Structure B

More specifically, Structure A is an example according to various embodiments, illustrating a schematic chemical structure of a ruthenium catalyst that may be used for high temperature metathesis chemistry. Structure B is an example according to various embodiments, illustrating a schematic chemical structure of a ruthenium catalyst that may be used for high temperature metathesis chemistry. The ruthenium catalysts illustrated in Structure A and in Structure B may be referred to as Hoveyda-Grubb's type catalysts that contain asymmetric N-heterocyclic carbene ligands or cyclic(alkyl) (amino) carbene ligands. The catalysts are stable at ambient conditions for extended periods of time.

It has been discovered that other catalysts of similar structure may also be employed, differing in structure to those of Structure A and Structure B by the substitution on the aromatic rings, the alkyl group of the alky aryl ether, and with ligands other than Cl⁻ can be employed as the thermally stable equivalent catalysts for metathesis reactions. For example, Structure C is an example according to various embodiments, illustrating a schematic chemical structure of a ruthenium catalyst that may be used for high temperature metathesis chemistry. Given certain selections of the functional groups ($R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, and $R_{16}$), Structure C includes or encompasses both Structure A and Structure B.

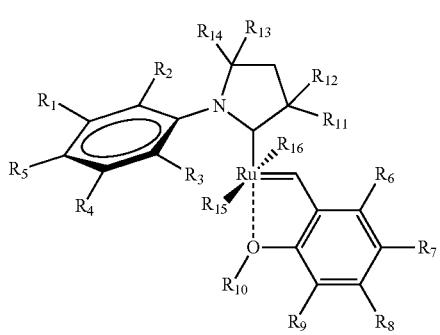

Structure C

The following lists provide some examples of the functional groups that may be employed in Structure C. The functional groups listed are merely examples; other functional groups may be employed. Referring to Structure C, functional groups $R_1$, $R_2$, $R_3$, $R_4$, $R_5$, $R_6$, $R_7$, $R_8$, $R_9$, $R_{10}$, $R_{11}$, $R_{12}$, $R_{13}$, and $R_{14}$ may be the same or different and may each be independently selected from hydrogen (H), a linear $C_1$-$C_6$ hydrocarbon, a branched $C_3$-$C_6$ hydrocarbon, and a cyclic $C_3$-$C_6$ hydrocarbon. Still referring to Structure C, functional groups $R_{15}$ and $R_{16}$ may be the same or different and may each be any negative ligand. For example, functional groups $R_{15}$ and $R_{16}$ may be the same or different and may each be independently selected from Cl— (chloro), CN— (cyano), Br— (bromo), O— (oxo), OH— (hydroxo), $CO_3$— (carbonato), $CH_3COO$— (acetato), SCN— (thiocyanato), $SO_4$— (sulphato), $C_2O_4$— (oxalato), and $NO_2$— (nitrito). In this context, "independently selected" means that each group may be chosen from the list of options without respect to the selection made from the list for any other groups, allowing the functional groups to be the same or different.

Various embodiments are directed to methods of performing metathesis chemistry at temperatures of at least 100° C.
Acyclic Diene Metathesis Polymerization (ADMET) Polymerization or Copolymerization According to various embodiments, the high-temperature metathesis polymerization may be an ADMET polymerization or copolymerization, where one or more non-conjugated acyclic diene has a boiling point in excess of 100° C. and a melting point ($T_m$) below the polymerization temperature.

The polymerization temperature may be in a range having a lower limit and/or an upper limit. The range may include or exclude the lower limit and/or the upper limit. The lower limit and/or upper limit can be selected from about 20, 30, 40, 50, 60, 70, 80, 90, 100, 110, 120, 130, 140, 150, 160, 170, 180, 190, and 200° C. For example, according to certain embodiments, the polymerization temperature may be in a range of from about 20° C. to about 200° C., or any combination of lower limits and upper limits described.

The catalyst concentration may be in a range having a lower limit and/or an upper limit. The range may include or exclude the lower limit and/or the upper limit. The lower limit and/or upper limit can be selected from about 0.3, 0.35, 0.4, 0.45, 0.5, 0.55, 0.6, 0.65, 0.7, 0.75, 0.8, 0.85, 0.9, 0.95, and 1 mol percent. For example, according to certain embodiments, the catalyst concentration may be in a range of from about 0.3 to about 1 mol percent, or any combination of lower limits and upper limits described.

The reaction time may be in a range having a lower limit and/or an upper limit. The range may include or exclude the lower limit and/or the upper limit. The lower limit and/or upper limit can be selected from about 5, 10, 15, 20, 25, 30, 35, 40, 45, 50, 55, 60, 65, 70, 75, 80, 85, 90, 95, and 100 hrs. For example, according to certain embodiments, the reaction time may be of from about 5 to about 100 hrs, or any combination of lower limits and upper limits described.

Polymerization or copolymerization may optionally be carried out in the melt. The polymerization or copolymerization may employ a catalyst as illustrated in Structure A, Structure B, or Structure C, or an equivalent thereof. The polymerization may be carried out in a solvent having a boiling point greater than the temperature of polymerization. Although an advantage of various embodiments is the elimination of solvent, a solvent may be used. An example of a solvent that may be used is propylene carbonate. The acyclic diene may be a functionalized diene or an unfunctionalized diene, where any functionalization does not inhibit or poison the catalyst. If functionalization occurs too close to the terminal olefin (less than 3 methylene spacers) coordination of the functional group with the catalyst could occur simultaneously or preferentially with respect to the olefin. This will limit catalyst/olefin reactivity and therefore polymer molecular weight/reaction progress. A functionalized diene may be functionalized with one or more functional groups. The functional groups may be, separately or in combination, alkyl, aryl, alkylaryl, ketone, aldehyde, ether, ester, carboxylic acid, alkylsilyl, arylsilyl, alkylarylsilyl, amine, epoxy, sulfone, sulfonic acid ester, amides, or any other functional group. Hydrogenation may be performed in any suitable manner.

For example, an unsaturated polymer may be combined with 3 equiv of p-toluenesulfonyl hydrazine (TSH) and tripropylamine (TPA) dissolved in o-xylene. After a bubbler is attached, the reaction mixture may be refluxed until nitrogen is no longer being evolved from the reaction vessel. After addition of more TSH and TPA, the mixture may be refluxed until no more nitrogen is released. The solvent may be removed, and the polymer may be analyzed via 13C and 1H NMR to determine whether complete saturation was achieved According to various other embodiments and examples, hydrogenation has been performed using a 150 mL Parr high-pressure stainless steel reaction vessel equipped with a 50 mL round bottom flask and a Teflon stirring bar/0.15 g of unsaturated polymers may be dissolved in 20 mL of anhydrous toluene and degassed for 1 hour before adding 15 wt % of Pd/C. The round bottom flask was placed into the bomb and then sealed. The Parr vessel was purged with 500 psi of hydrogen gas three times. The bomb was then charged to 900 psi, and the mixture was stirred for 5 days at 90° C. The resultant polymer was filtered and precipitated into cold methanol to obtain a white solid, which was then filtered, transferred to a vial and dried under high vacuum (3×10-4 mmHg) overnight, yielding 0.13 g (87%) of final polymer.

According to various embodiments high-temperature metathesis polymerization may be an ADMET polymerization or copolymerization may produce a polymer or a copolymer having a wide range of molecular weights. The polymers or copolymers may have a weight average (Mw) within a range having a lower limit and/or an upper limit. The range may include or exclude the lower limit and/or the upper limit. The lower limit and/or upper limit can be selected from about 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, and 200 kg/mol. For example, according to certain embodiments, the polymers or copolymers may have a weight average (Mw) of from about 35 to about 130 kg/mol, or any combination of lower limits and upper limits described.

Ring-Opening Metathesis Polymerization (ROMP)

According to various embodiments, the high-temperature metathesis polymerization may be a ring-opening metathesis polymerization (ROMP) or copolymerization carried out at temperatures in excess of 100° C. A functionalized or unfunctionalized cyclic olefin or alkene may have a boiling point in excess of 100° C. and a $T_m$ below the polymerization temperature. Polymerization or copolymerization may optionally be carried out in the melt. The polymerization or copolymerization may employ a catalyst as illustrated in Structure A, Structure B, or Structure C, or an equivalent thereof. The polymerization can be carried out in a solvent with a boiling point greater than the temperature of polymerization. The polymerization can be carried out to high molecular weights as long as functional groups on the cyclic olefin or alkene does not inhibit or poison the catalyst. The functional groups of the cyclic olefin or alkene may be, separately or in combination, alkyl, aryl, alkylaryl, ketone, aldehyde, ether, ester, carboxylic acid, alkylsilyl, arylsilyl, alkylarylsilyl, amine, epoxy, sulfone, sulfonic acid ester, amides, or any other functional group.

Ring-Closure Metathesis

According to various embodiments, the high-temperature metathesis polymerization may be a ring-closure metathesis can be carried out using the catalysts of Structure A, Structure B, Structure C, or their equivalent. The ring-closure can be carried out at temperatures in excess of 100° C. where a functionalized or unfunctionalized non-conjugated diene has a boiling point in excess of 100° C. and a $T_m$ below the metathesis reaction temperature. The reaction can be carried out in the melt for some dienes or carried out in solution and employing a catalyst of Structure A, Structure B, Structure C, or their equivalent. The metathesis reaction solvent should have a boiling point greater than the temperature of the reaction. Functional groups of a functionalized non-conjugated diene can be, separately or in combination, alkyl, aryl, alkylaryl, ketone, aldehyde, ether, ester, carboxylic acid, alkylsilyl, arylsilyl, alkylarylsilyl, amine, epoxy, sulfone, sulfonic acid ester, amides, or any other functional group.

Olefin-Exchange Metathesis

According to various embodiments, the high-temperature metathesis chemistry may be olefin-exchange metathesis can be carried out using the catalysts of Structure A, Structure B, Structure C, or their equivalent. The exchange reaction can be carried out at temperatures in excess of 100° C. where a functionalized or unfunctionalized ene, diene, triene or polyene has a boiling point in excess of 100° C. and a $T_m$ below the metathesis reaction temperature. The exchange can be driven to a single product or a plurality of products depending upon the proportion of reactant olefins, their relative concentration, their symmetry, volatility of an exchange product, or other factor. The functional groups can be, separately or in combination, alkyl, aryl, alkylaryl, ketone, aldehyde, ether, ester, carboxylic acid, alkylsilyl, arylsilyl, alkylarylsilyl, amine, epoxy, sulfone, sulfonic acid ester, amides, or any other functional group.

EXAMPLES

The following examples are put forth to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for.

The purpose of the following examples is not to limit the scope of the various embodiments, but merely to provide examples illustrating specific embodiments. Example 1 illustrates a reaction scheme for high temperature polymerization of bis-pent-4-enesulfone to a poly(oct-4-ene-alt-sulfone) and its hydrogenation to poly(octyl-alt-sulfone). Example 2 illustrates a reaction scheme for high temperature polymerization of bis-pent-4-enesulfone to a poly(oct-4-ene-alt-sulfone) and its hydrogenation to poly(octyl-alt-sulfone).

Example 1

In an exemplary embodiment, the synthesis of poly(octylene) at 100° C. occurs, as shown Reaction Scheme 1, using a catalyst according to Structure A, Structure B, or Structure C. More specifically, Reaction Scheme 1 is an example according to various embodiments, illustrating a reaction scheme for high temperature polymerization of 1,9-decadiene to poly(octylene) and its hydrogenation to polyethylene.

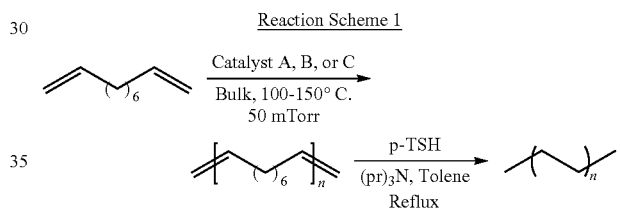

The melting temperature of poly(octylene) is 30° C. by differential scanning calorimetry (DSC). High molecular weight polymer was formed by this step growth polymerization. The poly(octylene) can be converted to polyethylene by hydrogenation, where the melting temperature of the resulting polyethylene is approximately 130° C. The melting temperature indicates that no branching occurs during the polymerization.

FIG. 1 is a plot of weight average molecular weight dependence of unsaturated poly(octylene) on reaction time at 100° C. using a catalyst according to Structure A and a catalyst according to Structure B.

Data from FIG. 1 is summarized in Table 1.

TABLE 1

| Time (hrs) | Mw (g/mol) |
|---|---|
| Catalyst Structure A | |
| 5 | 43000 |
| 20 | 51500 |
| 40 | 64000 |
| 93 | 63000 |
| Catalyst Structure B | |
| 5 | 36000 |
| 24 | 33000 |
| 52 | 44000 |
| 96 | 39000 |

Example 2

The synthesis of a sulfone monomer, was carried out as is known in the prior art, for example as disclosed in Gaines et al. Reaction Scheme 2 is an example according to various embodiments, illustrating a reaction scheme for high temperature polymerization of bis-pent-4-enesulfone to a poly(oct-4-ene-alt-sulfone) and its hydrogenation to poly(octyl-alt-sulfone).

Reaction Scheme 2

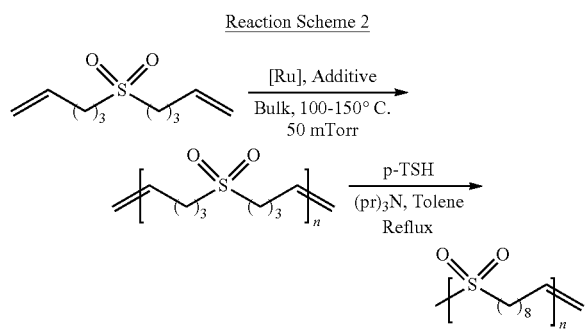

The solid monomer was heated above its melting temperature of 40° C. and degassed.

Polymerizations were performed at various reaction temperatures, times, and with various catalyst levels.

Figure 2:
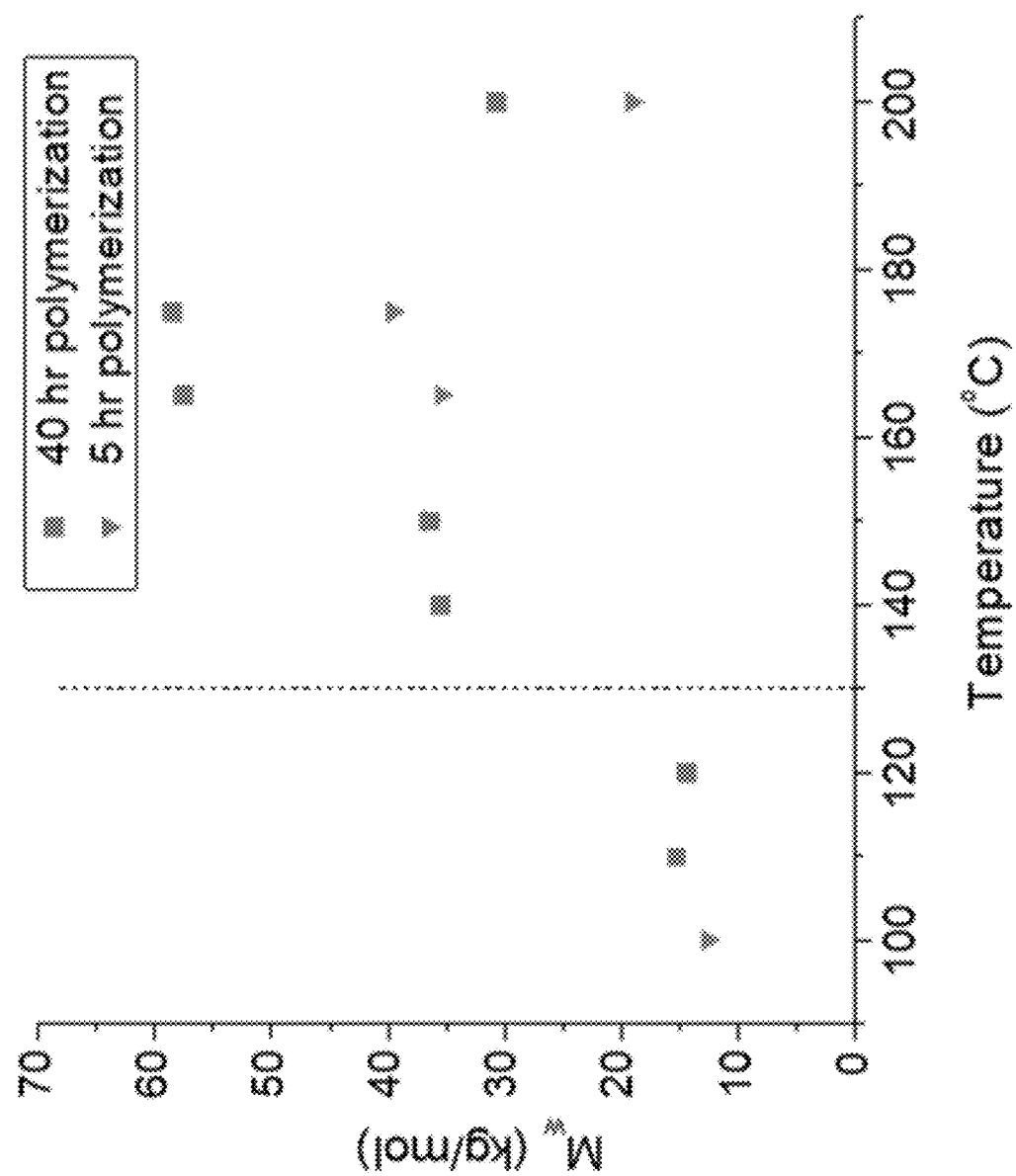
FIG. 2: is an example according to various embodiments, illustrating a plot of the weight average molecular weight (Mw) achieved for poly(oct-4-ene-alt-sulfone) at different temperatures (° C.) of polymerization at both 5 and 40 hour reaction times using a catalyst according to Structure A.

FIG. 2 is an example according to various embodiments, illustrating a plot of the weight average molecular weight (Mw) achieved for poly(oct-4-ene-alt-sulfone) at different temperatures (° C.) of polymerization. FIG. 2 shows a clear dependence of molecular weight with polymerization temperature. Polymerizations performed below the $T_m$ of the unsaturated polysulfone achieved a molecular weight (MW) on the order of 15 kg/mol. The MW doubled upon raising the polymerization temperature above the $T_m$. The increase in MW was attributed to increased polymer chain-end diffusion due to removing constraints imposed by formation of crystalline domains. FIG. 2 displays the MW of polymers formed using a reaction time of 40 hours. The dependence of MW on temperature being above $T_m$ occurs even when reaction times are longer. Data from FIG. 2 is summarized in Table 2.

TABLE 2

| Temp (° C.) | Mw (g/mol) |
|---|---|
| 5 hr reaction time | |
| 110 | 15283 |
| 120 | 14368 |
| 140 | 35512 |
| 150 | 36544 |
| 165 | 57489 |
| 175 | 58452 |
| 200 | 30754 |
| 40 hr reaction time | |
| 100 | 12644 |
| 150 | 36458 |
| 165 | 35498 |
| 175 | 39608 |
| 200 | 19123 |

Figure 3:
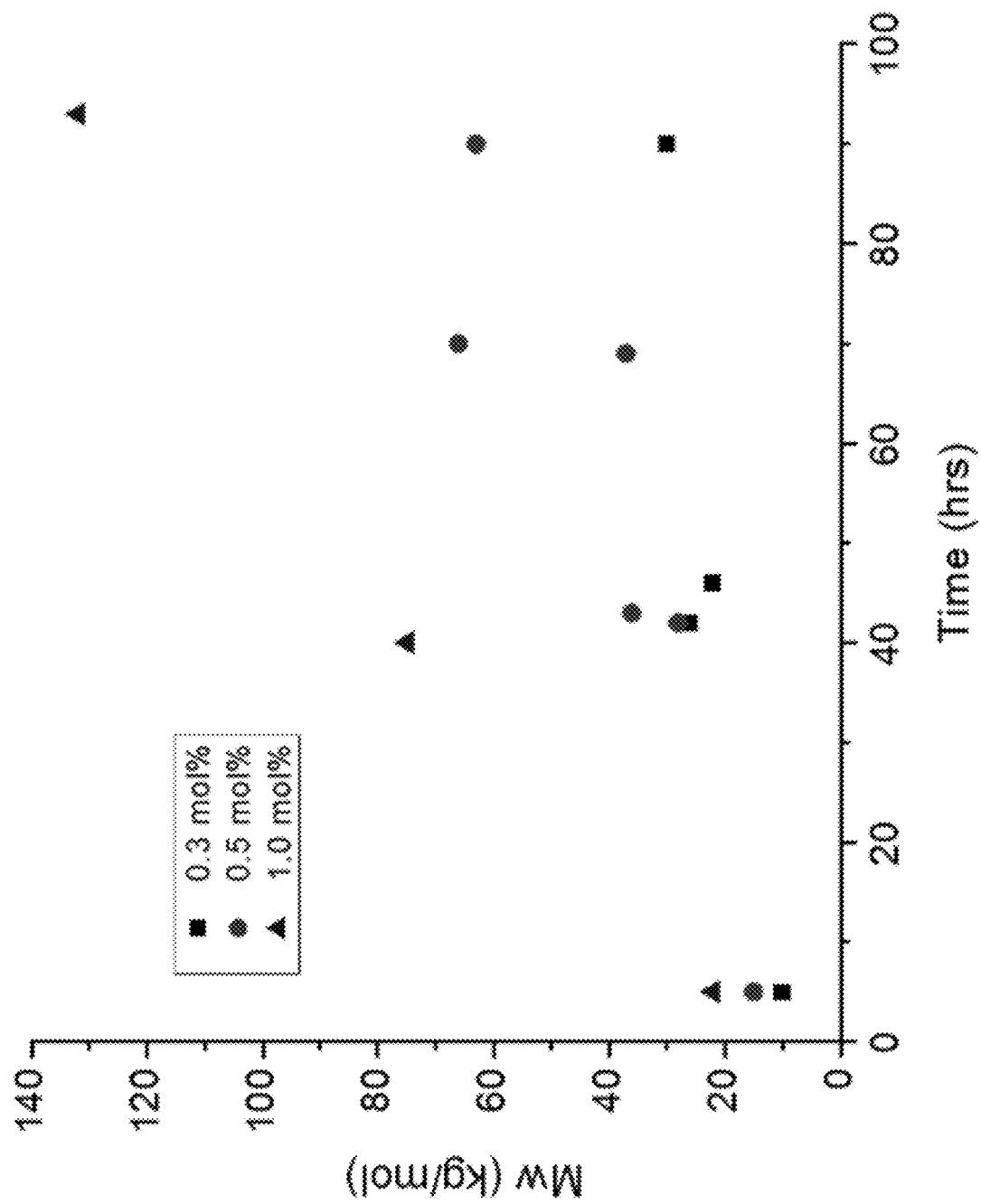
FIG. 3: is an example according to various embodiments, illustrating a plot of the weight average molecular weight (Mw) increase over a 100 hour period for poly(oct-4-ene-alt-sulfone) polymerized at 150° C. for catalyst loadings of 0.3 mole %, 0.5 mole %, and 1.0 mole %.

FIG. 3 is an example according to various embodiments, illustrating a plot of the weight average molecular weight (Mw) increase over a 100 hour period for poly(oct-4-ene-alt-sulfone) polymerized at 150° C. for catalyst loadings of 0.3 mole %, 0.5 mole %, and 1.0 mole %. FIG. 3 shows the polysulfone's molecular weight dependence on polymerization time and catalyst concentration. Molecular weight increases with increasing reaction time and greater catalyst concentrations for catalyst concentrations of 0.3 to 1.0 mol %; which is typical of catalyst concentrations used for ADMET polymerizations. Inefficient stirring due to the highly viscous polymer melts impedes formation of high MW. The results of FIG. 2 and FIG. 3 were achieved with magnetic stirring, and superior rates are expected from other modes of agitation. The data from FIG. 3 is summarized in Table 3.

TABLE 3

| Time (hrs) | Mw (g/mol) |
|---|---|
| 0.33 mol % catalyst | |
| 5 | 34859 |
| 42 | 26448 |
| 90 | 58624 |
| 0.50 mol % catalyst | |
| 5 | 36458 |
| 43 | 36544 |
| 70 | 66207 |
| 90 | 63962 |
| 1.0 mol % catalyst | |
| 5 | 48017 |
| 40 | 87162 |
| 93 | 132187 |

The aliphatic polysulfones show a melting temperature dependence on the polymerization temperature. Increased reaction temperatures prompted a decrease in the melting temperature of a saturated polymer formed upon hydrogenation. Polymerizations performed at 100° C. resulted in saturated polysulfones upon hydrogenation that display a $T_m$ of 180° C. When the polymerization temperature was raised to 150° C., the saturated polymer $T_m$ decreases to 155° C. The decrease in melting temperature is consistent with olefin isomerization of the monomer at higher temperatures, leading to various methylene spacing between sulfone groups of the resulting saturated copolymer. The optional addition of benzoquinone additives at 2-4 mol % of the diene monomer may be employed to suppress olefin isomerization. The saturated polysulfone's $T_m$ at 150° C. polymerization temperature was similar to that of the 100° C. polymerization in the absence of the benzoquinone.

Figure 4:
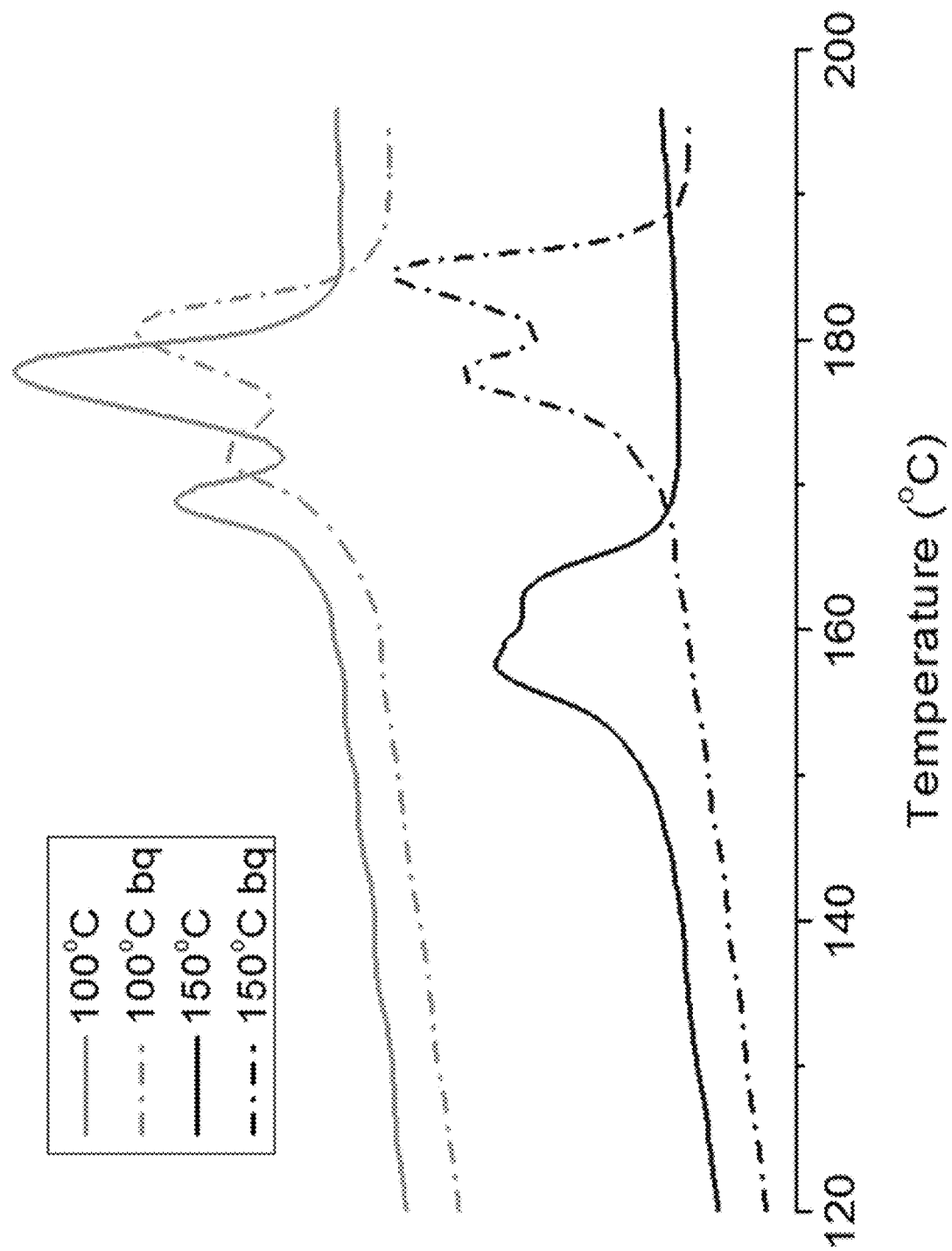
FIG. 4: is an example according to various embodiments, illustrating a differential scanning calorimetry (DSC) curve for the poly(oct-4-ene-alt-sulfone) that was formed upon polymerization at 100 and 150° C., with and without benzoquinone included with the catalyst.

FIG. 4 is an example according to various embodiments, illustrating a differential scanning calorimetry (DSC) curve for the poly(oct-4-ene-alt-sulfone) that was formed upon polymerization at 100 and 150° C., with and without benzoquinone included with the catalyst. FIG. 4 shows DSC results for the polysulfones polymerized at 100 and 150° C., with and without benzoquinone. The addition of benzoquinone at 100° C. polymerization temperature had only a small effect on the saturated polymers' melting temperatures ($T_m$), which is consistent with little or no isomerization occurring at 100° C. polymerization temperatures, whereas at 150° C. in the absence of benzoquinone, significant isomerization appears to occur.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C § 112, sixth paragraph. In particular, the use of "step of" in the claims herein is not intended to invoke the provisions of 35 U.S.C § 112, sixth paragraph.

All patents, patent applications, provisional applications, and publications referred to or cited herein, supra or infra, are incorporated by reference in their entirety, including all figures and tables, to the extent they are not inconsistent with the explicit teachings of this specification.

It should be emphasized that the above-described embodiments of the present disclosure are merely possible examples of implementations and are merely set forth for a clear understanding of the principles of this disclosure. It should be understood that the examples and embodiments described herein are for illustrative purposes only and that various modifications or changes in light thereof will be suggested to persons skilled in the art and are to be included within the spirit and purview of this application. Many variations and modifications may be made to the above-described embodiment(s) of the disclosure without departing substantially from the spirit and principles of the disclosure. All such modifications and variations are intended to be included herein within the scope of this disclosure and protected by the following claims.

What is claimed is:

1. A method of metathesis ring-closure, comprising:
   combining
      at least one acyclic non-conjugated diene,
      a benzoquinone, and
      a Ruthenium-based catalyst comprising a cyclic(alkyl)(amino)carbene ligand
   to form a reaction mixture; and
   heating the reaction mixture to a temperature above 100° C.

2. The method of metathesis ring-closure according to claim 1, wherein the non-conjugated diene comprises a functional group selected from alkyl, aryl, alkylaryl, ketone, aldehyde, ether, ester, carboxylic acid, alkylsilyl, arylsilyl, alkylarylsilyl, amine, epoxy, sulfone, sulfonic acid ester, and amides.

3. The method of metathesis ring-closure according to claim 1, wherein the temperature is 120° C. or greater.

4. The method of metathesis ring-closure according to claim 1, wherein the reaction mixture further comprises a solvent having a boiling point in excess of the reaction temperature at the reaction pressure.

5. The method of metathesis ring-closure according to claim 1, wherein the catalyst is:

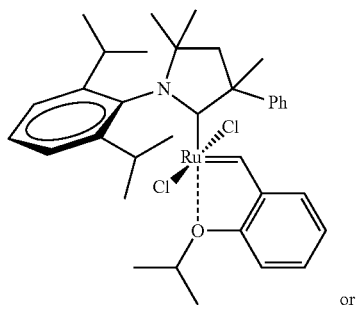

or

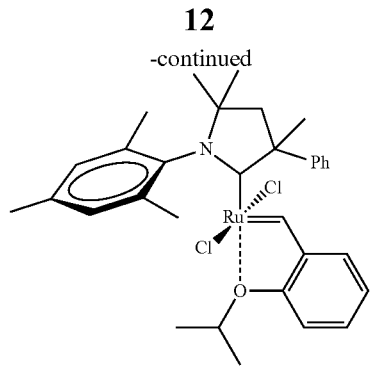

6. A method of metathesis ring-closure, comprising:
   combining at least one acyclic non-conjugated diene with a Ruthenium-based catalyst comprising a cyclic(alkyl)(amino)carbene ligand to form a reaction mixture; and
   heating the reaction mixture to a temperature above 100° C.,
   wherein the Ruthenium-based catalyst is:

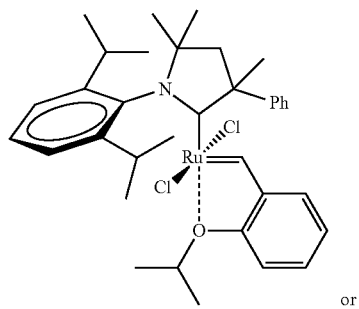

or

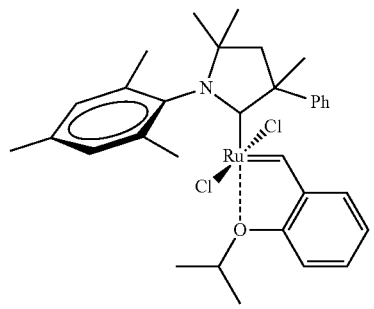

7. The method of metathesis ring-closure according to claim 6, wherein the non-conjugated diene comprises a functional group selected from alkyl, aryl, alkylaryl, ketone, aldehyde, ether, ester, carboxylic acid, alkylsilyl, arylsilyl, alkylarylsilyl, amine, epoxy, sulfone, sulfonic acid ester, and amides.

8. The method of metathesis ring-closure according to claim 6, wherein the temperature is 120° C. or greater.

9. The method of metathesis ring-closure according to claim 6, wherein the reaction mixture further comprises a quinone.

10. The method of metathesis ring-closure according to claim 9, wherein the quinone is benzoquinone.

11. The method of metathesis ring-closure according to claim 6, wherein the reaction mixture further comprises a solvent having a boiling point in excess of the reaction temperature at the reaction pressure.

* * * * *